United States Patent [19]

Yamawaki

[11] Patent Number: 5,604,646
[45] Date of Patent: Feb. 18, 1997

[54] DATA ERROR CORRECTING METHOD AND SIGNAL PROCESSING UNIT FOR DISK ACCESSING APPARATUS

[75] Inventor: Hirofumi Yamawaki, Kasugai, Japan

[73] Assignee: Fujitsu Limited, Kanagawa, Japan

[21] Appl. No.: 550,840

[22] Filed: Oct. 31, 1995

[30]   Foreign Application Priority Data

Nov. 11, 1994  [JP]  Japan .................................. 6-277813

[51] Int. Cl.$^6$ ........................................................ G11B 5/09
[52] U.S. Cl. .................................. 360/53; 360/51; 369/54
[58] Field of Search .................................. 360/51, 53, 26; 369/53, 54, 59, 60

[56]               References Cited

U.S. PATENT DOCUMENTS

4,841,513  6/1989  Farhangi et al. .......................... 369/59
4,931,884  6/1990  Aoki ........................................ 360/26

Primary Examiner—W. C. Kim
Attorney, Agent, or Firm—Nikaido, Marmelstein, Murray & Oram LLP

[57]               ABSTRACT

A data error correcting method for a disk accessing apparatus including a drive head, a speed matching buffer and a buffer memory is disclosed. Data is read from a disk by the drive head. When a sync pattern is detected in the read data, target data following the sync pattern is sequentially read to temporally store the target data to the speed matching buffer. The target data is transferred from the speed matching buffer to the buffer memory, and is subjected to an error correcting operation. When the detection of sync pattern is unsuccessful, the buffer memory is supplied with dummy data directly, that is, the dummy data does not pass through the speed matching buffer. The dummy data corresponds to the target data following the sync pattern that fails to be detected.

15 Claims, 10 Drawing Sheets

Fig.3 recording direction →

| | | | | | | | |
|---|---|---|---|---|---|---|---|
| SB1 | SB2 | SB3 | D1 | D2 | D3 | D4 | D5 |
| | | | D6 | D7 | D8 | D9 | D10 |
| | | | D11 | D12 | D13 | D14 | D15 |
| | | RS1 | D16 | D17 | D18 | D19 | D20 |
| | | | D21 | D22 | D23 | D24 | D25 |
| | | | D26 | D27 | D28 | D29 | D30 |
| | | RS2 | D31 | D32 | D33 | D34 | D35 |
| | | RS33 | D496 | D497 | D498 | D499 | D500 |
| | | | D501 | D502 | D503 | D504 | D505 |
| | | | D506 | D507 | D508 | D509 | D510 |
| | | RS34 | D511 | D512 | FF | FF | FF |
| | | | FF | CRC1 | CRC2 | CRC3 | CRC4 |
| | | | Ea1 | Eb1 | Ec1 | Ed1 | Ee1 |
| | | | Ea2 | Eb2 | Ec2 | Ed2 | Ee2 |
| | | RS35 | Ea3 | Eb3 | Ec3 | Ed3 | Ee3 |
| | | | Ea4 | Eb4 | Ec4 | Ed4 | Ee4 |
| | | | Ea14 | Eb14 | Ec14 | Ed14 | Ee14 |
| | | RS39 | Ea15 | Eb15 | Ec15 | Ed15 | Ee15 |
| | | | Ea16 | Eb16 | Ec16 | Ed16 | Ee16 | interleave    1    2    3    4    5

DATA ERROR CORRECTING METHOD AND SIGNAL PROCESSING UNIT FOR DISK ACCESSING APPARATUS

BACKGROUND OF THE INVENTION

1. Field of the Invention

The present invention relates to a method for correcting erroneous data read from a recording medium such as an optical disk or a magnetic disk, and a disk accessing apparatus which can effect the method.

2. Description of the Related Art

Disk accessing apparatuses, which execute data transfer with recording media such as an optical disk and a magnetic disk, require a fast operational speed. One way of increasing the operational speed of a disk accessing apparatus is to increase the operational speed of a signal processing unit provided in the disk accessing apparatus. To meet this requirement, the signal processing unit includes a first-in first-out (FIFO) type speed matching buffer provided between a disk interface and a data transfer unit.

Figure 1:
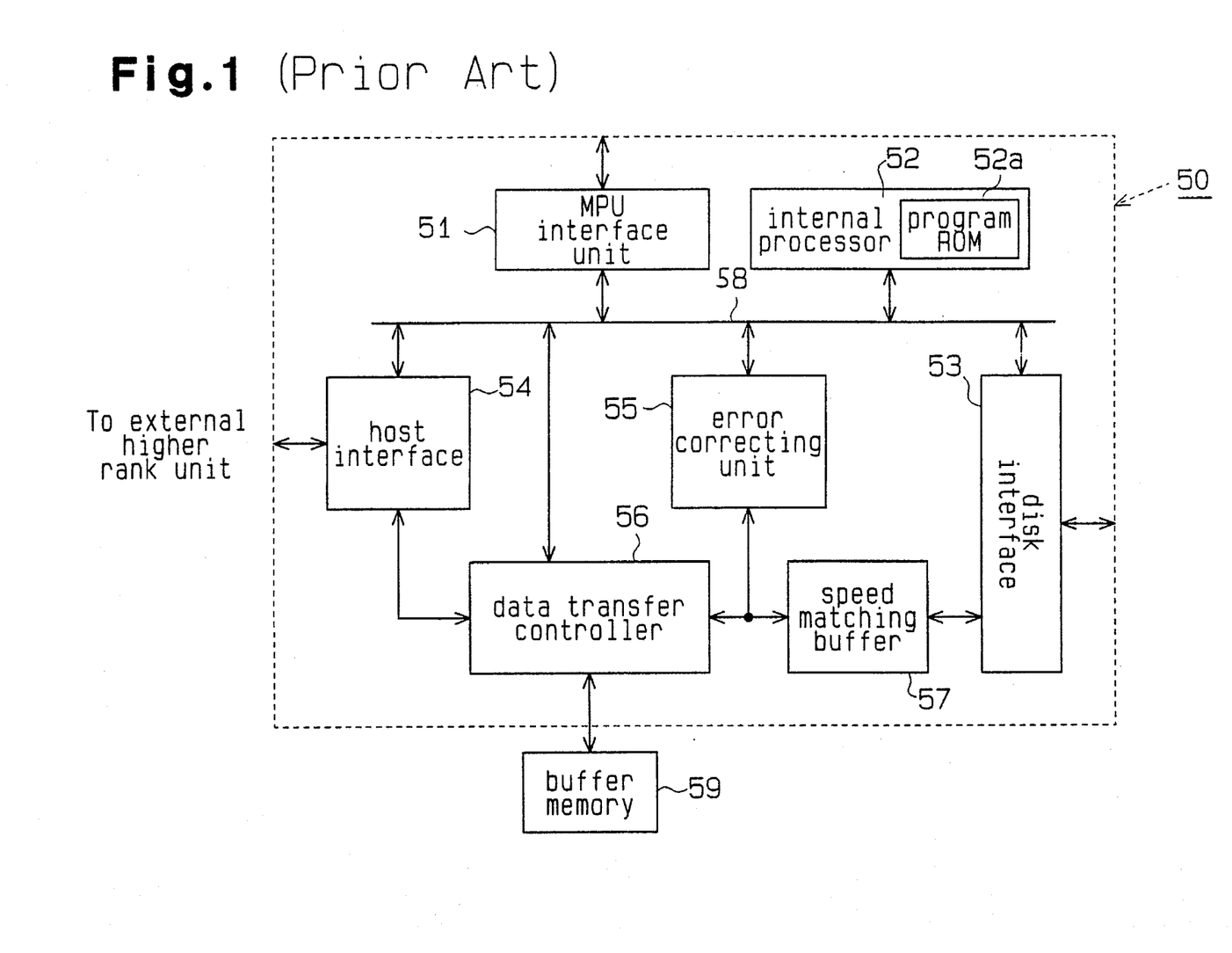
FIG. 1 is a block circuit diagram for explaining a conventional signal processing unit of a disk accessing apparatus.

FIG. 1 is a block diagram of a conventional signal processing unit provided in a disk accessing apparatus for an optical disk. The signal processing unit 50 includes an MPU (Micro Processing Unit) interface unit 51, an internal processor 52, a disk interface 53, a host interface 54, an error correcting unit 55 and a data transfer controller 56, which are connected to one another via an internal control bus 58. The signal processing unit 50 further includes a speed matching buffer 57.

The MPU interface unit 51 exchanges control signals with an MPU (not shown) performing the general system control of the disk accessing apparatus. The internal processor 52 includes a program ROM (Read Only Memory) 52a, and performs the general control of the signal processing unit 50 in accordance with firmware stored in the program ROM 52a. The disk interface 53 is connected to a drive head (not shown) in the disk accessing apparatus. The disk interface 53 receives read data $D_R$, i.e., signals read from an optical disk by the drive head. From this read $D_R$, the disk interface 53 reads data in the ID portion in a sector and determines if the sector is the target sector.

Figure 2:
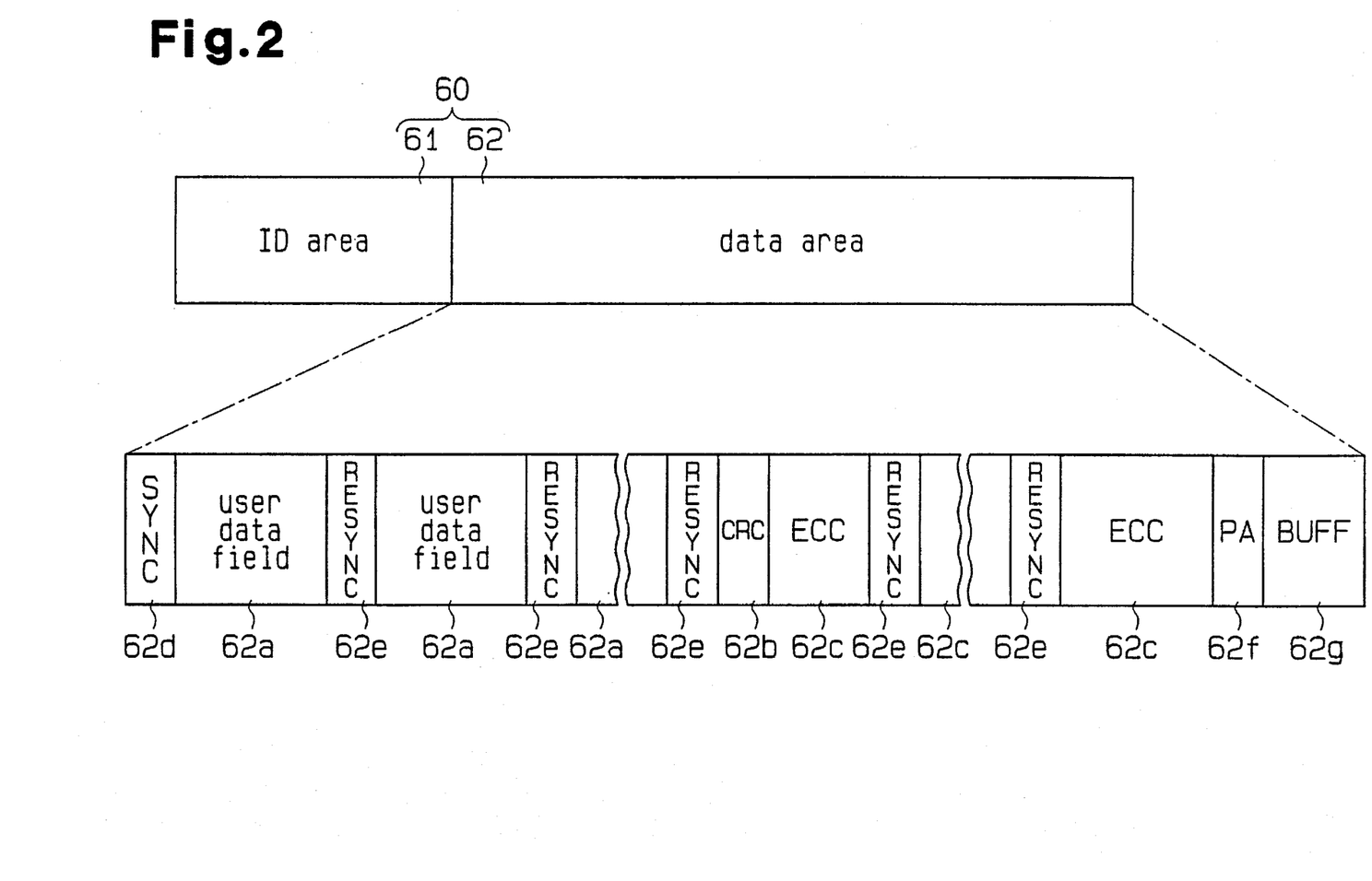
FIG. 2 is an explanatory diagram for explaining sector format.

FIG. 2 shows the sector format of an optical disk formatted according to the ISO standards (3.5 inches and single-density capacity). Each sector 60 is separated into an ID area 61 and a data area 62. The ID area 61 includes a sector mark field, a plurality of lock-up pattern fields, a plurality of address mark fields, a plurality of physical address fields, a postamble field and an optical offset, which are not shown. The sector mark field is where a sector mark is to be recorded. The lock-up pattern fields are where lock-up patterns are to be recorded. The address mark fields are where addresses are to be recorded. The physical address fields are where physical addresses are to be recorded. The data area 62 includes a plurality of user data fields 62a, a cyclic redundancy check (CRC) field 62b, an error correction code (ECC) field 62c, a sync pattern (SYNC) field 62d, a plurality of resync pattern (RESYNC) fields 62e, a postamble (PA) field 62f and a buffer (BUFF) field 62g. The sync pattern field 62d is provided at the head of the data area 62. The resync pattern fields 62e are provided among the individual fields 62a, 62b and 62c.

Figure 3:
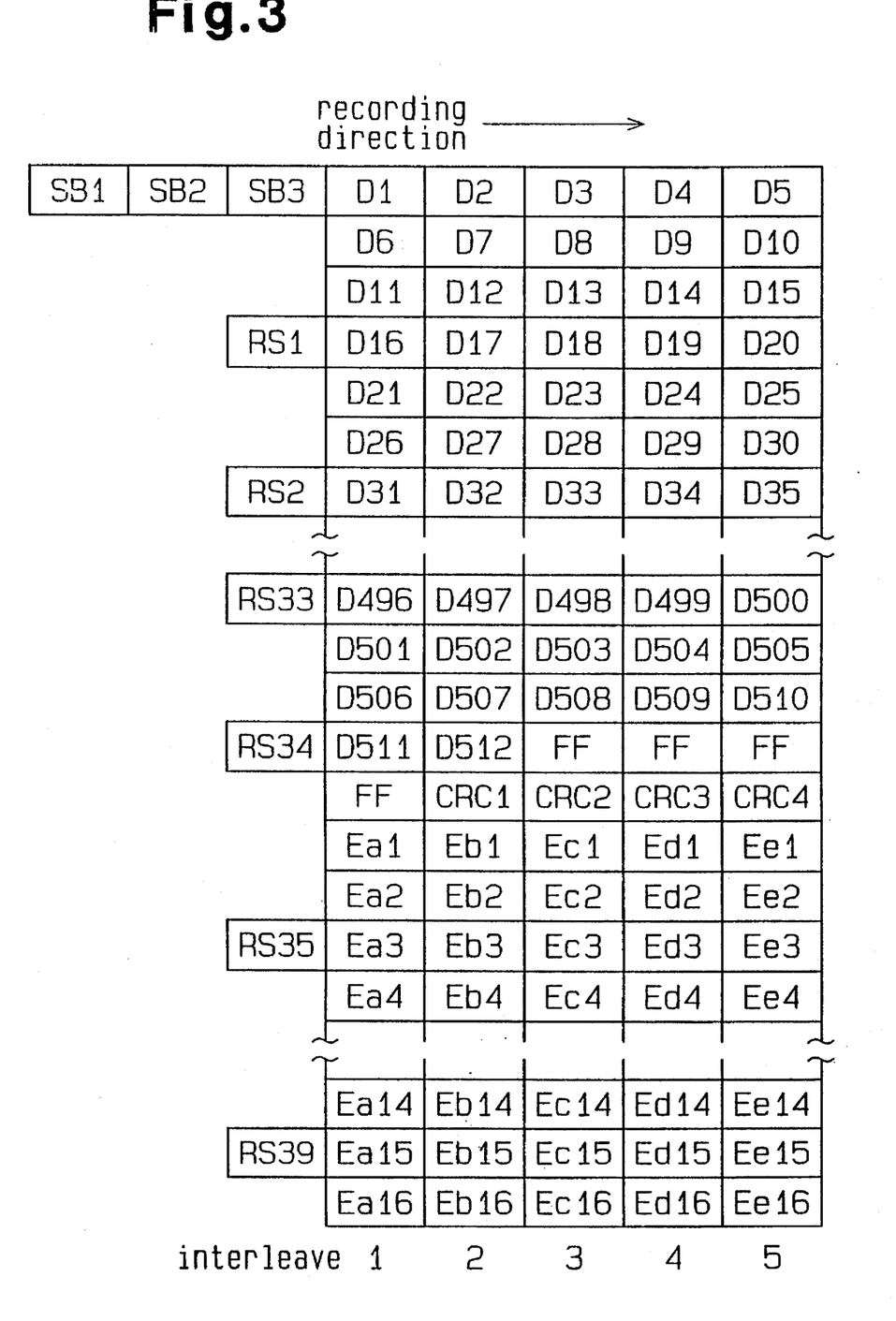
FIG. 3 is an explanatory diagram for explaining the relationship between data in a data area and interleaves.

FIG. 3 presents the detailed illustration of the user data fields 62a, the cyclic redundancy check fields 62b, the error correction code fields 62c, the sync pattern field 62d, and the resync pattern fields 62e.

The sync pattern field 62d includes three sync patterns SB1, SB2 and SB3. Each of the sync patterns SB1–SB3 consists of one byte. The resync pattern fields 62e include thirty-nine resync patterns RS1 to RS39. Each of the resync patterns RS1–RS39 consists of one byte.

The user data fields 62a each consisting of fifteen bytes are provided between the sync pattern SB3 and the resync pattern RS1 and among the resync patterns RS1–RS34. Groups of fifteen bytes of data D1 to D15, D16 to D30, . . ., and D496 to D510 are recorded in the respective user data fields 62a.

Recorded between the resync patterns RS34 and RS35 are two bytes of data D511 and D512, four bytes of empty data FF, four bytes of cyclic redundancy check codes CRC1 to CRC4, and ten bytes of error correction codes Ea1 to Ee1 and Ea2 to Ee2. The four CRC codes CRC1 to CRC4 comprise the CRC field 62b.

The ECC fields 62c are provided among the resync patterns RS35 to RS39. Each ECC field 62c consists of fifteen one-byte error correction codes. Hence, sixty one-byte error correction codes Ea3 to Ee3, . . . , and Ea14 to Ee14 are recorded between the resync patterns RS35 and RS39. Ten one-byte error correction codes Ea15 to Ee15 and Ea16 to Ee16 are recorded after the last resync pattern RS39. Thus, eighty error correction codes Ea1 to Ee1, . . . , and Ea16 to Ee16 and five hundred and twelve data D1 to D512 are recorded in one sector.

The individual patterns, data and codes in each sector 60 are arranged in the direction of the arrow and the top-to-down direction in FIG. 3. In FIG. 3, one vertical line or column of data written in this order is called an "interleave". In this case, there are five interleaves. One interleave therefore consists of 120 bytes of data.

Error correction is carried out for each interleave. Sixteen error correction codes are assigned to each of the interleaves 1 to 5. For example, the error correction codes Ea1 to Ea16 are assigned to interleave 1 and the error correction codes Ed1 to Ed16 are assigned to interleave 4.

The Reed-Solomon code which exhibits a high correction performance is used for the error correction codes for each interleave, with one byte treated as an element of one code word. It is possible to detect which byte in a single interleave is in error and how it is in error, up to eight bytes (eight pieces of data). The Reed-Solomon code on an optical disk treats each element of the code word as an element of a Galois field in byte correction.

The disk interface 53 detects each data in the ID area 61 in a sector 60 to determine if the sector 60 is the target one. The disk interface 53 reads the sync patterns SB1–SB3 and resync patterns RS1–RS39 in the data area 62. When the reading of the sync patterns SB1–SB3 and resync patterns RS1–RS39 is successful, the disk interface 53 sends subsequently read data $D_R$ regarding individual data and codes to the speed matching buffer 57 and the error correcting unit 55. The disk interface 53 sends write data $D_W$ to be recorded on an optical disk to the drive head in accordance with the aforementioned format.

The speed matching buffer 57 is a first-in first-out (FIFO) type buffer memory. The FIFO buffer 57 has sixteen address areas with a capacity of one byte per address. The FIFO buffer 57 receives data from the disk interface 53 byte by byte and sequentially outputs the data to the data transfer controller 56. The data transfer controller 56 receives data from the FIFO buffer 57 and stores the data in a buffer memory 59.

The data and individual codes in one sector 60, which are supplied to the FIFO buffer 57 from the disk interface 53, are also sent to the error correcting unit 55. When receiving one sector of data and codes, the error correcting unit 55 performs an error correction operation for each interleave. The error correction operation for each interleave acquires a syndrome from the entire code word of 120 bytes which constitutes that interleave. Based on this syndrome, it is detected which byte in the interleave is in error and how it is in error. When a byte is in error, the internal processor 52 sends a replacement value to the data transfer controller 56. Based on the replacement value, the data transfer controller 56 corrects the erroneous content of the data and codes which have been previously stored in the buffer memory 59.

Thereafter, the error-corrected data in the buffer memory 59 is read out to the data transfer controller 56 and is then transferred via the host interface 54 to an external higher rank external unit (not shown).

The data transfer controller 56 also receives write data $D_W$ from the external higher rank unit via the host interface 54 and temporarily stores the write data $D_W$ in the buffer memory 59. Thereafter, the data transfer controller 56 reads the write data $D_W$ from the buffer memory 59 and sends the write data $D_W$ to the disk interface 53 via the FIFO buffer 57.

This signal processing unit 50 has the FIFO buffer 57 provided between the disk interface 53 and the data transfer controller 56. Even when the data transfer controller 56 performs data transfer with an external higher rank unit using the buffer memory 59, the disk interface 53 can read the read data $D_R$ from the optical disk and can write the data read in the FIFO buffer 57. The instance the data transfer process with the external higher rank unit is completed, therefore, the data transfer controller 56 can read data from the FIFO buffer 57 and can transfer it to the buffer memory 59. This allows the signal processing unit 50 to immediately execute the next signal processing operation, thus quickening the signal processing by the signal processing unit 50.

When reading the sync patterns SB1–SB3 fails, the disk interface 53 determines that the detection has failed. Then, the disk interface 53 outputs dummy data $D_D$ to the FIFO buffer 57. The dummy data $D_D$ corresponds in number (fifteen) to the data D1 to D15 in the user data field 62a located between the sync patterns SB1–SB3 and the resync pattern RS1. Each dummy data $D_D$ consists of one byte whose bits are all "0". The dummy data $D_D$ output to the FIFO buffer 57 is sequentially stored in the buffer memory 59 via the data transfer controller 56.

When reading the resync patterns RS1 to RS39 is successful, the disk interface 53 sequentially outputs the subsequent read data $D_R$ i.e., the data in the user data field 62a and the individual codes in the CRC field 62b and the ECC field 62c, to the FIFO buffer 57. The data transfer controller 56 reads the data and codes from the FIFO buffer 57 and stores the same in the buffer memory 59.

The dummy data $D_D$, the data in the user data field 62a and the individual codes in the CRC field 62b and the ECC field 62c are also sent to the error correcting unit 55. Based on one sector of data and codes including this dummy data $D_D$, the error correcting unit 55 executes an operation for error correction for each interleave. In this case, the error correcting unit 55 finds out how many of the whole dummy data $D_D$ are in error. The internal processor 52 sends a replacement value for each dummy data $D_D$ stored in the buffer memory 59 to the data transfer controller 56. Based on the replacement values, the data transfer controller 56 corrects the associated dummy data $D_D$ stored in the buffer memory 59. This error correction scheme is used in an optical disk accessing apparatus disclosed in Japanese Unexamined Patent Publication No. 1-124158.

Figure 4:
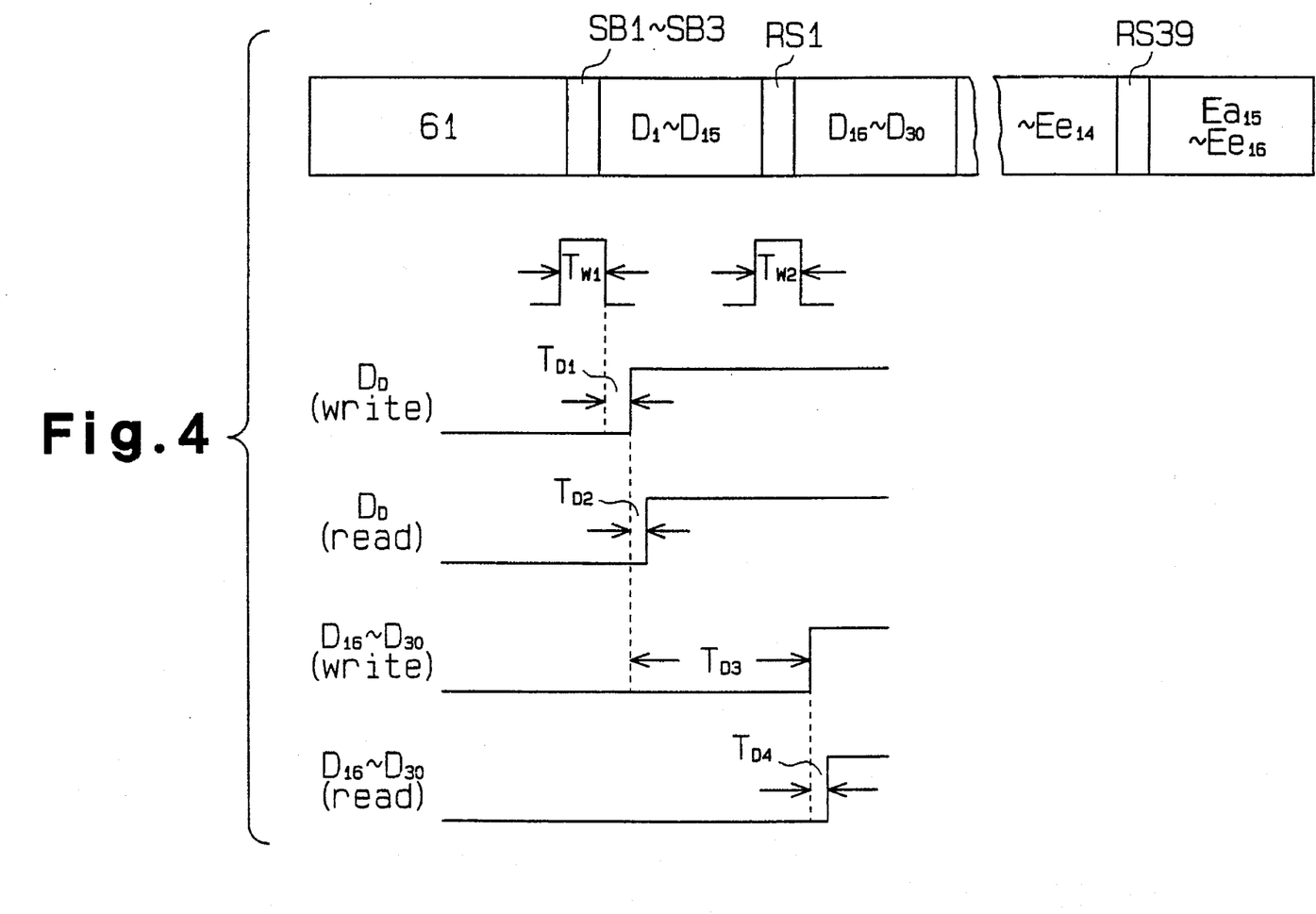
FIG. 4 is a timing chart for explaining the operation of the signal processing unit shown in FIG. 1.

FIG. 4 shows a timing chart for the signal processing unit 50 when reading the sync patterns SB1–SB3 has failed. When reading the sync patterns SB1–SB3 fails during a detection timing (detection window) $T_{W1}$ for the sync patterns SB1–SB3, the disk interface 53 outputs dummy data $D_D$. That is, when the detection timing (detection window) $T_{W1}$ passes and after determining whether or not the reading of the sync patterns has failed, the disk interface 53 outputs the dummy data $D_D$. After the detection timing (detection window) $T_{W1}$ passes, therefore, the dummy data $D_D$ is written in the FIFO buffer 57 with a delay of time $T_{D1}$. After a further delay of time $T_{D2}$, the dummy data $D_D$ is read from the FIFO buffer 57.

However, the writing of the dummy data $D_D$ into the FIFO buffer 57 of the conventional signal processing unit 50 involves the following problems.

Due to cost and size reductions, the FIFO buffer 57 has a small capacity, which is generally sixteen (16) bytes. When fifteen (15) bytes of dummy data $D_D$ are written in the FIFO buffer 57, the remaining capacity is just one (1) byte. Therefore, when the dummy data $D_D$ is written in the FIFO buffer 57 with a delay of time $T_{D1}$, a time $T_{D3}$ from the beginning of the writing of the dummy data $D_D$ into the FIFO buffer 57 to the beginning of the writing of the data D16–D30 in the user data field 62a, (following the next resync pattern RS1 read out), becomes shorter. Consequently, the data D16–D30 cannot be written in the FIFO buffer 57 until there is sufficient available space in the FIFO buffer 57. Also, to complete the discussion of FIG. 4, $T_{W2}$ is the detection timing (detection window) for the resync pattern RS1, and $T_{D4}$ is the time from the beginning of the writing of the data D16–D30 to the beginning of the reading thereof.

Thus, when reading the sync patterns fails, it takes an inordinate amount of time to write data in the FIFO buffer 57.

SUMMARY OF THE INVENTION

The present invention relates to a data error correcting method that shortens the amount of processing time needed to perform after error correction when reading sync patterns has failed. The error correcting method according to the invention can, for example, be implemented as a signal processing unit for a disk accessing apparatus.

A data error correcting method according to an embodiment of the present invention includes the steps of: A) using a disk accessing apparatus including a drive head, a speed matching buffer and a buffer memory; B) loading read data from a disk as a recording medium by the drive head; C) detecting or identifying a sync pattern in the read data; D) sequentially reading target data following the sync pattern to temporally store the target data to the speed matching buffer; E) transferring the target data stored in the speed matching buffer to the buffer memory; F) subjecting the target data stored in the buffer memory to an error correcting operation; and G) supplying the buffer memory with dummy data without passing through the speed matching buffer when the detection of sync pattern is unsuccessful, wherein the dummy data corresponds to the target data following the sync pattern that fails to be detected.

A signal processing unit for a disk accessing apparatus according to an embodiment of the present invention performs data error correction in read data from a disk as a recording medium by a drive head of the disk accessing apparatus. The signal processing unit includes a disk interface, a speed matching buffer, an error correcting unit and a data transfer controller. The disk interface detects a sync pattern in the read data, and sequentially reads and outputs target data following the detected sync pattern. The speed matching buffer temporally stores the target data supplied from the disk interface. The error correcting unit is supplied with the target data from the disk interface, and performs error correction of the target data. The data transfer controller transfers the target data from the speed matching buffer to a buffer memory, and performs error correction of the target data stored in the buffer memory with reference to the result of the data error correction by the error correcting unit. The disk interface includes a sync pattern detector for outputting a sync detection signal when a sync pattern is detected, and a sync-miss detection signal when the detection of a sync pattern is unsuccessful; and a data acquisition circuit responsive to the sync detection signal for permitting the read data to be input and for outputting the read data to the speed matching buffer. The data transfer controller includes a dummy data generator responsive to the sync-miss detection signal for generating dummy data corresponding to the target data following the sync pattern that fails to be detected. The dummy data is supplied to the buffer memory for use in error correction.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings.

DETAILED DESCRIPTION OF THE PREFERRED EMBODIMENTS

An optical disk accessing apparatus according to an embodiment of the present invention will now be described with reference to FIGS. 5 to 8.

Figure 5:
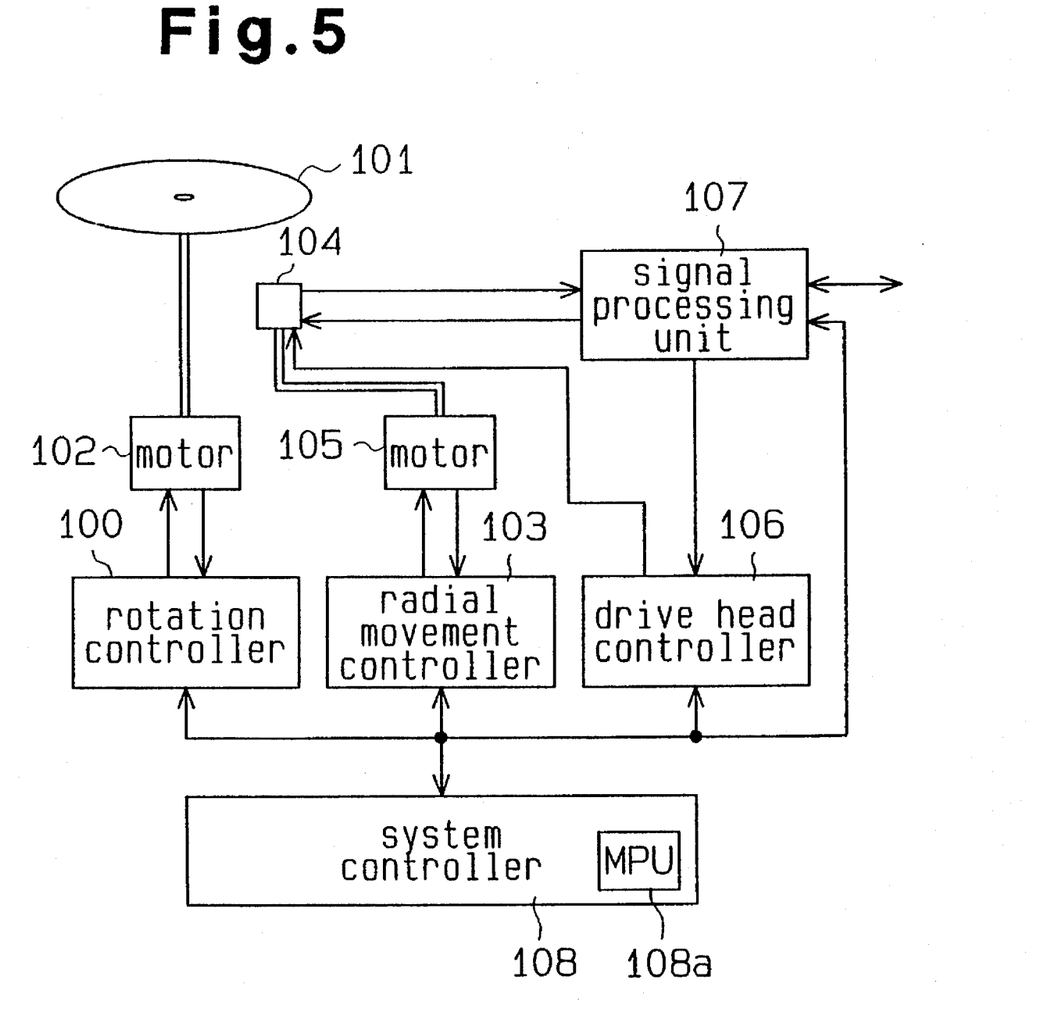
FIG. 5 is a block circuit diagram showing the basic structure of an optical disk accessing apparatus according to a first embodiment of the present invention.

FIG. 5 shows the schematic structure of an optical disk accessing apparatus. A rotation controller 100 controls a first motor 102 which causes an optical disk 101 as a recording medium to rotate. A radial movement controller 103 controls a second motor 105 which moves a drive head 104 in the radial direction with respect to the optical disk 101 or which causes the drive head 104 to seek the track position of a target sector. The drive head 104 is constituted of an optical pickup device, which reads data recorded on the optical disk 101 and writes data on the optical disk 101. A drive head controller 106 controls the drive head 104 to record and reproduce data on and from the optical disk 101.

A signal read by the drive head 104 is input as read data $D_R$ to a signal processing unit 107. The signal processing unit 107 reads necessary data from the read data $D_R$. The signal processing unit 107 is externally supplied with write data $D_W$ and sends the write data $D_W$ to the drive head 104 to write it in a desired sector of the optical disk 101. The sector format of the optical disk 101 is the same as the conventional sector format described above and illustrated in FIGS. 2 and 3.

A system controller 108 controls the individual controllers 100, 103 and 106 and the signal processing unit 107 to read and write data from and on the optical disk 101.

Figure 6:
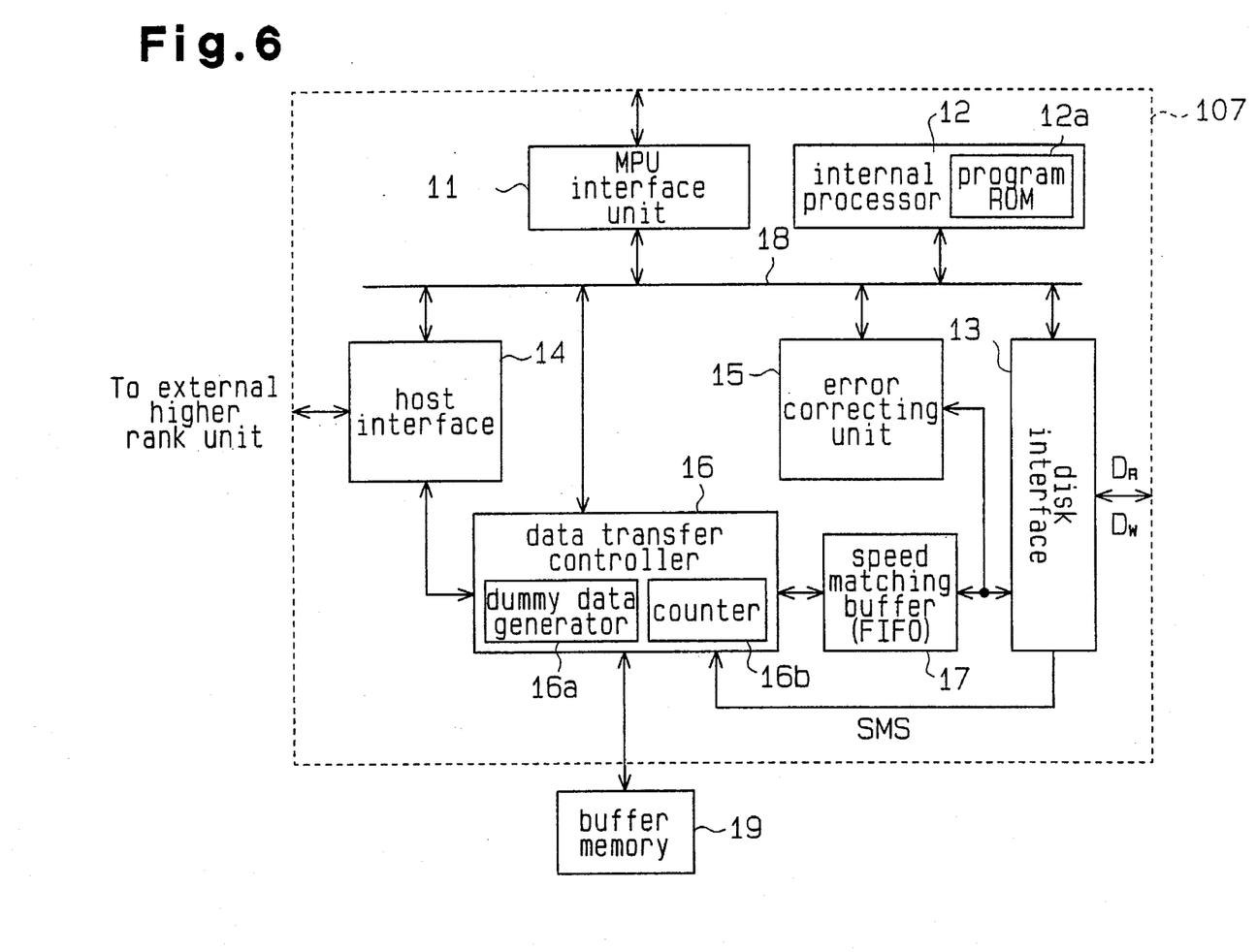
FIG. 6 is a block circuit diagram of a signal processing unit according to a first embodiment of the present invention.

FIG. 6 shows the schematic circuit configuration of the signal processing unit 107. The signal processing unit 107 includes an MPU interface unit 11, an internal processor 12, a disk interface 13, a host interface 14, an error correcting unit 15 and a data transfer controller 16, which are connected to one another via an internal control bus 18. The signal processing unit 107 further includes a speed matching buffer 17.

The MPU interface unit 11 exchanges control signals with an MPU (Micro Processing Unit) 108a in the system controller 108. The internal processor 12 performs the general control of the signal processing unit 107 in accordance with firmware stored in a program ROM 12a. The disk interface 13, which is connected to the drive head 104, receives read data $D_R$ which has been read by the drive head 104. The disk interface 13 reads data in the ID area 61 in a sector 60 of the read data $D_R$ and determines if the present sector is the target sector.

The disk interface 13 reads sync patterns SB1 to SB3 and resync patterns RS1 to RS39 in the data area 62 in the sector 60. When the reading of the sync patterns SB1 to SB3 and resync patterns RS1 to RS39 is successful, the disk interface 13 identifies subsequent read data $D_R$ as target data, and sends the target data to the speed matching buffer 17.

When the reading of the sync patterns SB1 to SB3 fails, the disk interface 13 sends a sync-miss detection signal (SMS) to the data transfer controller 16. In addition, the disk interface 13 sends nothing to the speed matching buffer 17 until the resync pattern RS1 is detected.

Figure 7:
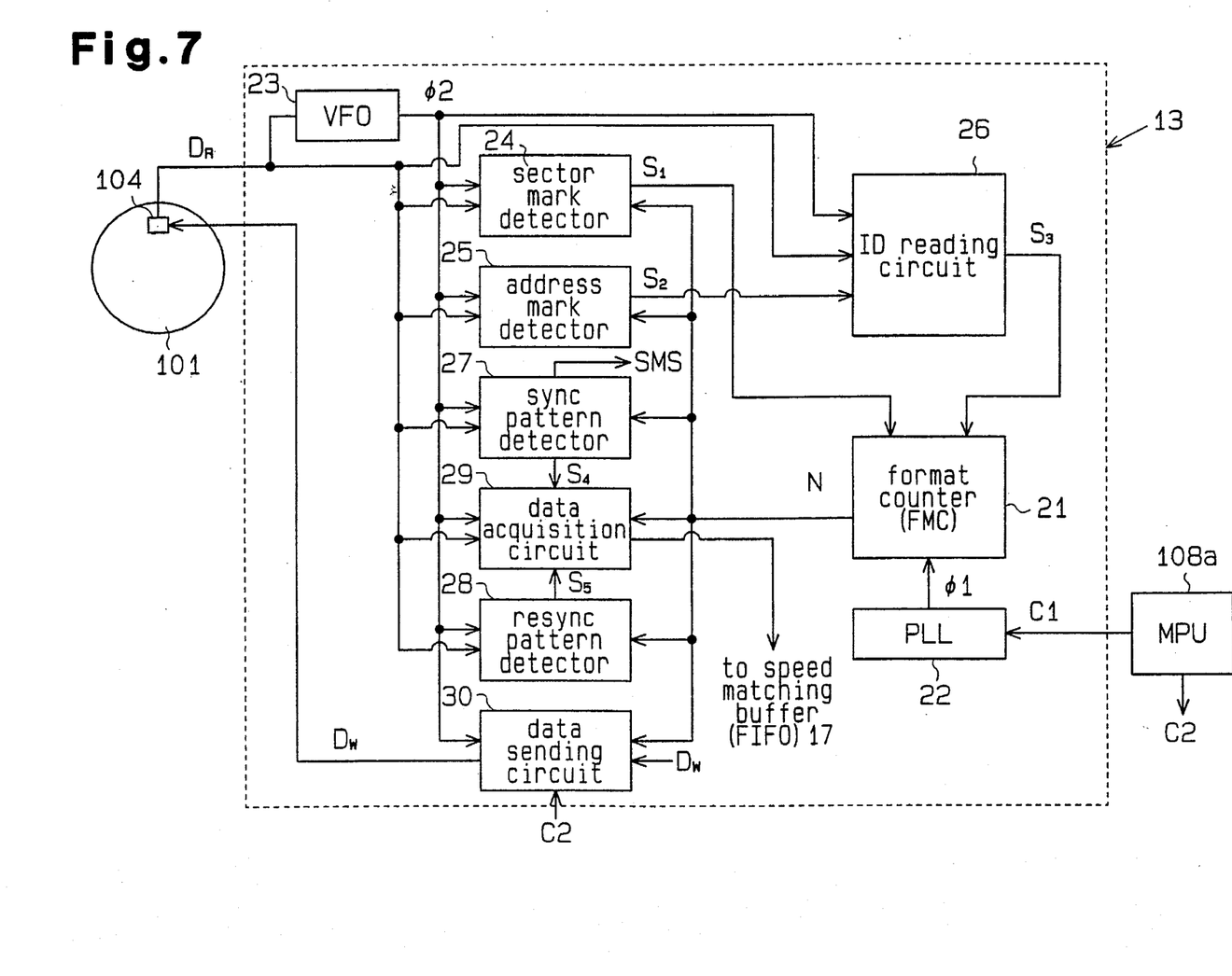
FIG. 7 is a block circuit diagram of a disk interface according to a first embodiment of the present invention.

FIG. 7 shows the detailed structure of the disk interface 13.

The disk interface 13 includes a format counter (hereinafter called "FMC") 21, a phase locked loop (PLL) frequency synthesizer (hereinafter simply called "PLL") 22, a variable frequency oscillator (VFO) 23, a sector mark detector 24, an address mark detector 25, an ID reading circuit 26, a sync pattern detector 27, a resync pattern detector 28, a data acquisition circuit 29 and a data sending circuit 30.

The PLL 22 receives a control signal C1 from the MPU 108a of the system controller 108. The PLL 22 generates a reference clock Φ1 with a frequency in accordance with the control signal C1 and supplies the clock to the FMC 21. The FMC 21 counts the number of pulses of the reference clock Φ1 and provides its count value N to the sector mark detector 24, the address mark detector 25, the sync pattern detector 27, the resync pattern detector 28, the data acquisition circuit 29 and the data sending circuit 30.

When the count value N matches with the total number of data bits in one sector, the FMC 21 is initialized and starts counting the reference clock $\Phi 1$ again. The FMC 21 receives a sector mark (SM) detection signal S1 from the sector mark detector 24 and a sync signal S3 from the ID reading circuit 26. In response to the SM detection signal S1, the count value N of the FMC 21 is set to a value N1 which is synchronized with the position of the drive head 104 passing at that time. In response to the sync signal S3, the count value of the FMC 21 is set to a value N2 which is synchronized with the position of the drive head 104 passing at that time. After being set to the value N1 or N2, the FMC 21 starts counting from the value N1 or N2.

The VFO 23 receives the read data $D_R$ from the drive head 104 and identifies a lock-up pattern recorded in the ID area 61 in that sector 60. The VFO 23 generates a read clock signal $\Phi 2$ based on the lock-up pattern.

The sector mark detector (hereinafter "SM detector") 24 receives the read clock $\Phi 2$ and the count value N from the FMC 21. The SM detector 24 goes to a search mode only when values Na and Nb are previously set and while the count value N is between the values Na and Nb (Na$\leq$N$\leq$Nb). Thus, the SM detector 24 reads the read data $D_R$ in synchronism with the read clock $\Phi 2$ only for that limited period (detection window). The values Na and Nb are determined such that when the count value N in the FMC 21 is synchronized with the position of the drive head 104, the SM detector 24 can surely detect the sector mark of a sector while the count value N satisfies Na$\leq$N$\leq$Nb. The SM detector 24 determines if the read data $D_R$ read during the period of Na$\leq$N$\leq$Nb is the sector mark. When the SM detector 24 determines that the read data $D_R$ is the sector mark, the SM detector 24 outputs the SM detection signal S1 to the FMC 21.

The address mark detector (hereinafter "AM detector") 25 receives the read clock $\Phi 2$ and the count value N from the FMC 21. The AM detector 25 goes to a search mode only when values Nc and Nd are previously set and while the count value N is between the values Nc and Nd (Nc$\leq$N$\leq$Nd). The AM detector 25 reads the read data $D_R$ in synchronism with the read clock $\Phi 2$ only for that limited period (detection window). The values Nc and Nd are determined such that when the count value N in the FMC 21 is synchronized with the position of the drive head 104, the AM detector 25 can surely detect the address mark of the sector 60 while the count value N satisfies Nc$\leq$N$\leq$Nd. The AM detector 25 determines if the read data $D_R$ during the period of Nc$\leq$N$\leq$Nd is the address mark. When the AM detector 25 determines that the read data $D_R$ is the address mark, the AM detector 25 outputs an AM detection signal S2 to the ID reading circuit 26.

In response to the AM detection signal S2, the ID reading circuit 26 goes to an operational mode for a predetermined period of time. In the operational mode, the ID reading circuit 26 reads the subsequent read data $D_R$ or data of physical address in a sector 60 in synchronism with the read clock $\Phi 2$, and checks whether the read data $D_R$ is physical address data. When the read data $D_R$ is physical address data, the ID reading circuit 26 considers that the reading of the physical address has succeeded and outputs the sync signal S3 to the FMC 21.

The sync pattern detector (hereinafter called "SYNC detector") 27 receives the read clock $\Phi 2$ and the count value N from the FMC 21. The SYNC detector 27 goes to a search mode only when values Ne and Nf are previously set and while the count value N is between the values Ne and Nf (Ne$\leq$N$\leq$Nf). The SYNC detector 27 reads the read data $D_R$ in synchronism with the read clock $\Phi 2$ only for that limited period (detection window $T_{W1}$). The values Ne and Nf are determined such that when the count value N in the FMC 21 is synchronized with the position of the drive head 104, the SYNC detector 27 can surely detect the sync patterns SB1–SB3 in a sector 60 while the count value N satisfies Ne$\leq$N$\leq$Nf. The SYNC detector 27 determines if the read data $D_R$ during the period of Ne$\leq$N$\leq$Nf is any of the sync patterns SB1–SB3. When the SYNC detector 27 determines that the read data $D_R$ is any of the sync patterns SB1–SB3, the SYNC detector 27 outputs a sync detection signal S4 to the data acquisition circuit 29.

The resync pattern detector (hereinafter "RESYNC detector") 28 receives the read clock $\Phi 2$ and the count value N from the FMC 21. The RESYNC detector 28 goes to a search mode only when values $Ng_{2n-1}$ and $Nh_{2n-1}$ (n is an integer between 1 to 20 and $Ng_{2n-1} < Nh_{2n-1}$) are previously set and while the count value N satisfies $Ng_{2n-1} \leq N \leq Nh_{2n-1}$. The RESYNC detector 28 reads the read data $D_R$ in synchronism with the read clock $\Phi 2$ only for that limited period (detection window $T_{W2}$). The values $Ng_1$ and $Nh_1$ to $Ng_{39}$ and $Nh_{39}$ are determined such that when the count value N in the FMC 21 is synchronized with the position of the drive head 104, the RESYNC detector 28 can surely detect the associated one of the resync patterns RS1–RS39 in a sector 60 while the count value N satisfies $Ng_{2n-1} \leq N \leq Nh_{2n-1}$. The RESYNC detector 28 determines if the read data $D_R$ during the period of $Ng_{2n-1} \leq N \leq Nh_{2n-1}$ is any of the resync patterns RS1–RS39. When the read data $D_R$ is the any of the resync patterns RS1–RS39, the RESYNC detector 28 outputs a resync detection signal S5 to the data acquisition circuit 29.

The data acquisition circuit 29 receives the sync detection signal S4, the resync detection signal S5, the read clock $\Phi 2$ and the count value N. The data acquisition circuit 29 goes to a search mode only when values $Ni_{2n}$ and $Nj_{2n}$ (n is an integer between 1 to 20 and $Ni_{2n} < Nj_{2n}$) are previously set and while the count value N satisfies $Ni_{2n} \leq N \leq Nj_{2n}$. The data acquisition circuit 29 reads the read data $D_R$ in synchronism with the read clock $\Phi 2$ only for that limited period (detection window). The values $Ni_2$ and $Nj_2$ to $Ni_{40}$ and $Nj_{40}$ are determined such that when the count value N in the FMC 21 is synchronized with the position of the drive head 104, the data acquisition circuit 29 can surely detect the data D1–D512, CRC codes CRC1–CRC4 and error correction codes Ea1–Ea16, . . . , Ee1–Ee16 while the count value N satisfies $Ni_{2n} \leq N \leq Nj_{2n}$. The data acquisition circuit 29 outputs the read data $D_R$ during the period of $Ni_{2n} \leq N \leq Nj_{2n}$, as the associated one of the data D1–D512, CRC codes CRC1–CRC4 and error correction codes Ea1–Ea16, . . . , Ee1–Ee16.

When the sync detection signal S4 has not been output (or when the sync-miss detection signal SMS has been output), the data acquisition circuit 29 does not read the data $D_R$ even when the count value N satisfies $Ni_2 \leq N \leq Nj_2$. When the detection of the sync patterns SB1–SB3 is not successful, therefore, the data acquisition circuit 29 does not read the data D1–D15 located between the sync patterns SB1–SB3 and the resync pattern RS1, and outputs nothing. Hence, in this case, no data is output from the data acquisition circuit 29 to the speed matching buffer 17.

The data sending circuit 30 goes to a write mode in response to a write mode signal C2 from the MPU 108a of the system controller 108. In the write mode, the data sending circuit 30 outputs write data $D_W$ to the drive head 104.

The speed matching buffer 17 is a first-in first-out (FIFO) type buffer memory. The FIFO buffer 17 in this embodiment has a capacity of 16 bytes, receives data from the data acquisition circuit 29 of the disk interface 13 byte by byte, and sequentially transfers the received data to the data transfer controller 16.

The data transfer controller 16 receives data from the FIFO buffer 17 and stores the received data in a buffer memory 19. The data transfer controller 16 receives the sync-miss detection signal SMS from the SYNC detector 27 of the disk interface 13. In response to the sync-miss detection signal SMS, the data transfer controller 16 sends dummy data $D_D$ of a one-byte length, produced by a dummy data generator 16a provided in the data transfer controller 16, to the buffer memory 19. The individual bits of the one-byte dummy data $D_D$ are all "0".

The data transfer controller 16 further includes a counter 16b, which counts up every time an one-byte dummy data $D_D$ is output in response to the sync-miss detection signal SMS. When the count value of the counter 16b reaches "15", the data transfer controller 16 terminates the transfer of dummy data $D_D$ because all fifteen (15) bytes of dummy data $D_D$ have been transferred. In other words, when the detection signal SMS is output, fifteen (15) bytes of dummy data $D_D$ is stored in the buffer memory 19 as temporal data corresponding to the data D1–D15 located between the sync patterns SB1–SB3 and the resync pattern RS1.

Figure 8:
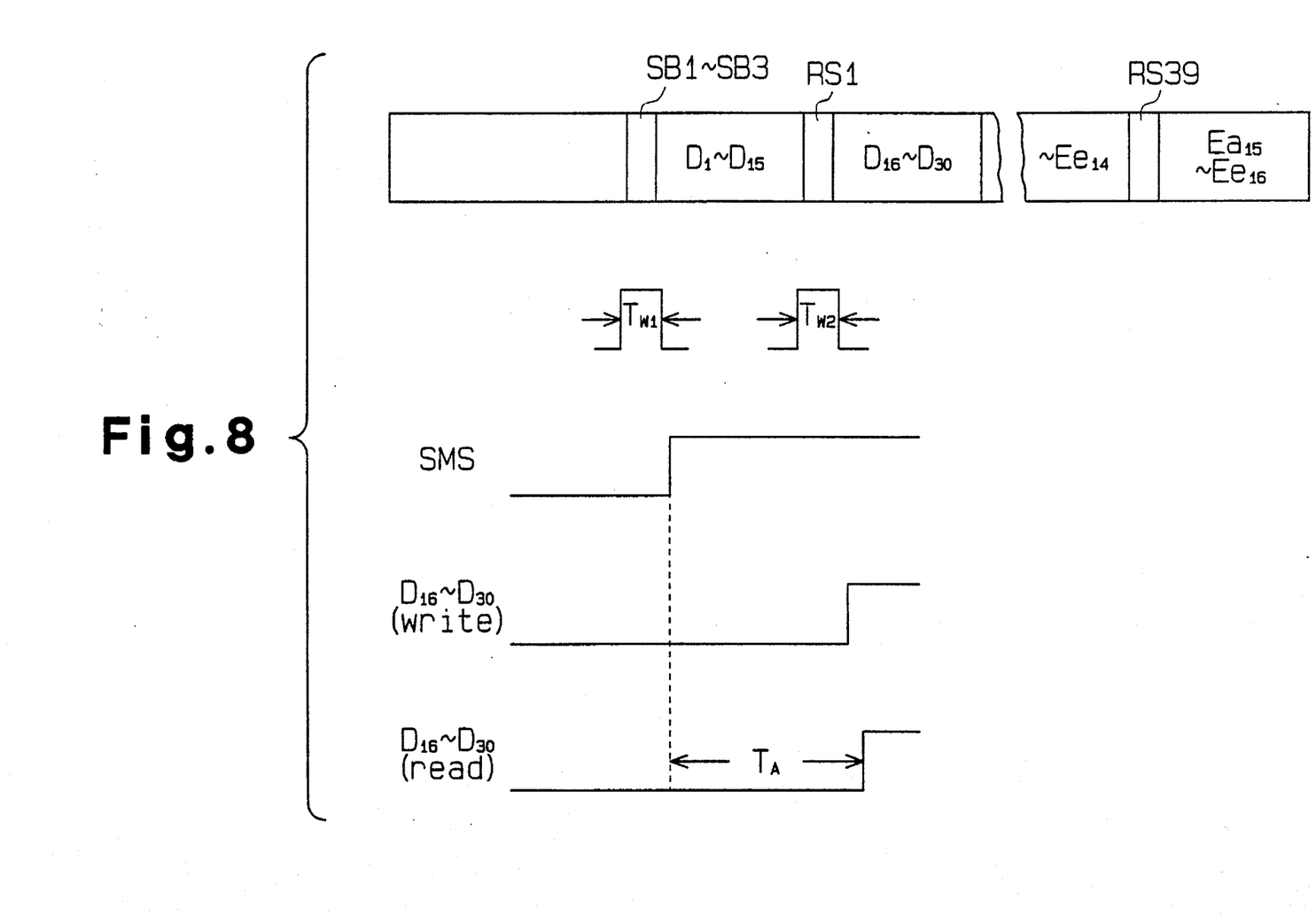
FIG. 8 is a timing chart for explaining the operation of the signal processing unit shown in FIG. 6.

The writing of the fifteen (15) bytes of dummy data $D_D$ into the buffer memory 19 is designed, as shown in FIG. 8, to be completed within a period of time $T_A$ until the first data D16 is read out while the data D16–D30 following the resync pattern RS1 is being written in the FIFO buffer 17.

The error correcting unit 15 receives the data and individual codes in each sector 60, which are output to the FIFO buffer 17 from the data acquisition circuit 29. When receiving one sector of data and codes, the error correcting unit 15 performs an error correction operation for each interleave. The error correction operation for each interleave, which is a known operation, acquires a syndrome from the entire code word of 120 bytes that constitutes that interleave. Based on this syndrome, it is possible to detect which byte in the interleave is in error and how it is in error and to correct errors in up to eight bytes.

When one or more data bytes are in error, the internal processor 12 sends replacement values to the data transfer controller 16. Based on these replacement values, the data transfer controller 16 corrects those bytes in error among the data and codes which are stored in the buffer memory 19. The data transfer controller 16 reads the error-corrected data from the buffer memory 19 and transfers the data read to an external higher rank unit (not shown) via the host interface 14.

The data transfer controller 16 also receives write data $D_W$ from an external higher rank unit via the host interface 14 and temporarily stores the received data $D_W$ in the buffer memory 19. Then, the data transfer controller 16 reads the write data $D_W$ from the buffer memory 19 and sends it to the data sending circuit 30 of the disk interface 13 via the FIFO buffer 17.

When data $D_R$ recorded on the optical disk 101 is read by the drive head 104, the signal processing unit 107 detects the ID area 61 in the sector 60 of the read data $D_R$. More specifically, based on the count value N of the FMC 21 in the disk interface 13, the SM detector 24 detects a sector mark, the AM detector 25 detects an address mark and the ID reading circuit 26 reads a physical address, thereby detecting the target sector.

When data in the ID area 61 is detected, the SYNC detector 27 reads the sync patterns SB1–SB3 only for the limited period (detection window $T_{w1}$) based on the count value N of the FMC 21. When the read data $D_R$ during the period of $Ne \leq N \leq Nf$ is any of the sync patterns SB1–SB3, the SYNC detector 27 outputs a sync detection signal S4 to the data acquisition circuit 29. In response to the detection signal S4, the acquisition circuit 29 goes to an operational mode to obtain the read data $D_R$ (data D1–D15) only for the limited period ($Ni_1 \leq N \leq Nj_1$) based on the count value N and to send the data to the FIFO buffer 17.

Subsequently, the RESYNC detector 28 reads the resync pattern RS1 only for the limited period $T_{w2}$ ($Ng_1 \leq N \leq Nh_1$) based on the count value N. When the RESYNC detector 28 determines that the read data $D_R$ is the resync pattern RS1, the RESYNC detector 28 outputs a resync detection signal S5 to the data acquisition circuit 29. In response to the detection signal S5, the data acquisition circuit 29 goes to an operational mode to obtain the read data $D_R$ (data D16–D30) only for the limited period ($Ni_2 \leq N \leq Nj_2$) based on the count value N and to send the data to the FIFO buffer 17.

Next, the RESYNC detector 28 reads the next resync pattern RS2 only for the limited period $T_{w2}$ ($Ng_2 \leq N \leq Nh_2$) based on the count value N. When the RESYNC detector 28 determines that the read data $D_R$ is the resync pattern RS2, the RESYNC detector 28 outputs a resync detection signal S5 to the data acquisition circuit 29. In response to the detection signal S5, the data acquisition circuit 29 goes to an operational mode to obtain the read data $D_R$ (data D31–D45) only for the limited period ($Ni_3 \leq N \leq Nj_3$) based on the count value N and to send the data to the FIFO buffer 17.

Thereafter, the resync patterns RS3–RS39 are detected by the RESYNC detector 28, and the read data $D_R$ (data D46–D512) are sent to the FIFO buffer 17 in the same manner.

The FIFO buffer 17 outputs one sector data from the data acquisition circuit 29 to the data transfer controller 16. The transfer controller 16 temporarily stores the one sector of data in the buffer memory 19.

The one sector of data is subjected to error correction in the error correcting unit 15. In accordance with the results of the error correction operation performed by the error correcting unit 15, one sector of data stored in the buffer memory 19 is corrected. The data transfer controller 16 reads one sector of corrected data from the buffer memory 19 and transfers the corrected data to an external higher rank unit via the host interface 14.

If the SYNC detector 27 is unable to determine the sync patterns SB1–SB3, the SYNC detector 27 sends a sync-miss detection signal SMS to the data transfer controller 16. Since a sync detection signal S4 is not sent to the data acquisition circuit 29 at this time, the data acquisition circuit 29 does not go to an operational mode. Therefore, the data acquisition circuit 29 does not obtain the read data $D_R$ (D1–D15) in the limited period ($Ni_1 \leq N \leq Nj_1$) based on the count value N of the FMC 21. As a result, the data acquisition circuit 29 sends nothing to the FIFO buffer 17 and the error correcting unit 15.

The data transfer controller 16, which has received the sync-miss detection signal SMS, causes the dummy data generator 16a to produce one byte of dummy data $D_D$ and then sequentially store the dummy data $D_D$ in the buffer memory 19. At this time, the counter 16b counts up every time the one byte dummy data $D_D$ is output. When the count value of the counter 16b reaches "15", the data transfer controller 16 causes the dummy data generator 16a to stop transferring the bytes of dummy data $D_D$. Therefore, the fifteen (15) bytes of dummy data $D_D$ are stored in the buffer memory 19 as temporal data corresponding to the data D1–D15 to be located between the sync patterns SB1–SB3 and the resync pattern RS1.

Subsequently, the RESYNC detector 28 reads the resync pattern RS1 only for the limited period $T_{W2}$ ($Ng_1 \leq N \leq Nh_1$). When determining that the read data $D_R$ is the resync pattern RS1, the RESYNC detector 28 outputs a resync detection signal S5 to the data acquisition circuit 29 to set the data acquisition circuit 29 in operational mode. The data acquisition circuit 29 obtains the read data $D_R$ (data D16–D30) only for the limited period ($Ni_2 \leq N \leq Nj_2$) and sends the read data $D_R$ to the FIFO buffer 17. Since nothing is stored in the FIFO buffer 17 at this time, the data acquisition circuit 29 can immediately write the obtained read data $D_R$ (data D16–D30) into the FIFO buffer 17.

Thereafter, the resync patterns RS2–RS39 are detected by the RESYNC detector 28, and the read data $D_R$ (data D30–D512, FF, CRC1–CRC4 and Ea1–Ee16) are sent to the FIFO buffer 17 in the same manner.

The FIFO buffer 17 outputs data D16–D512 in one sector from the data acquisition circuit 29 to the data transfer controller 16. The transfer controller 16 temporarily stores the received data together with the previously stored dummy data $D_D$ in the buffer memory 19 as one sector of data.

The error correcting unit 15 preforms an operation for error correction using the data D16–D512, FF, CRC1–CRC4 and Ea1–Ee16. That is, the error correcting unit 15 performs the error correction operation without using the dummy data $D_D$. The error correction operation is performed for each interleave to acquire a syndrome from the entire code word of 120 bytes that constitutes that interleave. Based on this syndrome, it is determined which byte in the interleave is in error and how it is in error. In this case, while data equivalent to the dummy data $D_D$ (e.g., three-byte data equivalent to the data D1, D6 and D11 for the interleave 1) is not used, the syndrome-oriented error correction operation treats the data, which is not used, as having a value of "0". In the error correction for each interleave, therefore, the first three bytes are treated as data "0". In other words, the same operational result can be obtained without sending the dummy data $D_D$ in the buffer memory 19 whose content is "0" to the error correcting unit 15.

One sector of data including dummy data $D_D$, stored in the buffer memory 19, is corrected based on the result of the error correction operation performed by the error correcting unit 15 in the same manner as described previously. The data transfer controller 16 reads one sector of corrected data from the buffer memory 19 and transfers the corrected data to an external higher rank unit via the host interface 14.

According to this embodiment of the present invention, when the data D1–D15 cannot be read due to the failure of reading the sync patterns SB1–SB3, the disk interface 13 produces no dummy data $D_D$ and sends nothing to the FIFO buffer 17. Instead, the disk interface 13 is designed to cause the SYNC detector 27 to send the sync-miss detection signal SMS to the data transfer controller 16. The data transfer controller 16 stores the dummy data $D_D$ from the dummy data generator 16a into the buffer memory 19 in response to a sync-miss detection signal SMS.

Since no dummy data $D_D$ is transferred via a FIFO speed matching buffer, empty memory space can be secured in the FIFO buffer 17 of the signal processing unit 107, thereby allowing the data D16–D30 following the resync pattern RS1 to be transferred to the FIFO buffer 17 without causing a data overflow. Therefore, the signal processing unit 107 of this embodiment can avoid the problem situation of the prior art where the previous dummy data $D_D$ remains in the FIFO buffer 17 and prevents the writing of the data D16–D30 therein. That is, the signal processing unit 107 need not wait for empty memory space to be provided in the FIFO buffer 17. Accordingly, the signal processing unit 107 can shorten the necessary time for error correction when reading the sync patterns SB1–SB3 has failed. What is more, the signal processing unit 107 of this embodiment can achieve this feature without increasing the capacity of the FIFO buffer 17.

Although only one embodiment of the present invention has been described herein, it should be apparent to those skilled in the art that the present invention may be embodied in many other specific forms without departing from the spirit or scope of the invention. Particularly, it should be understood that this invention may be embodied in the following forms.

Figure 9:
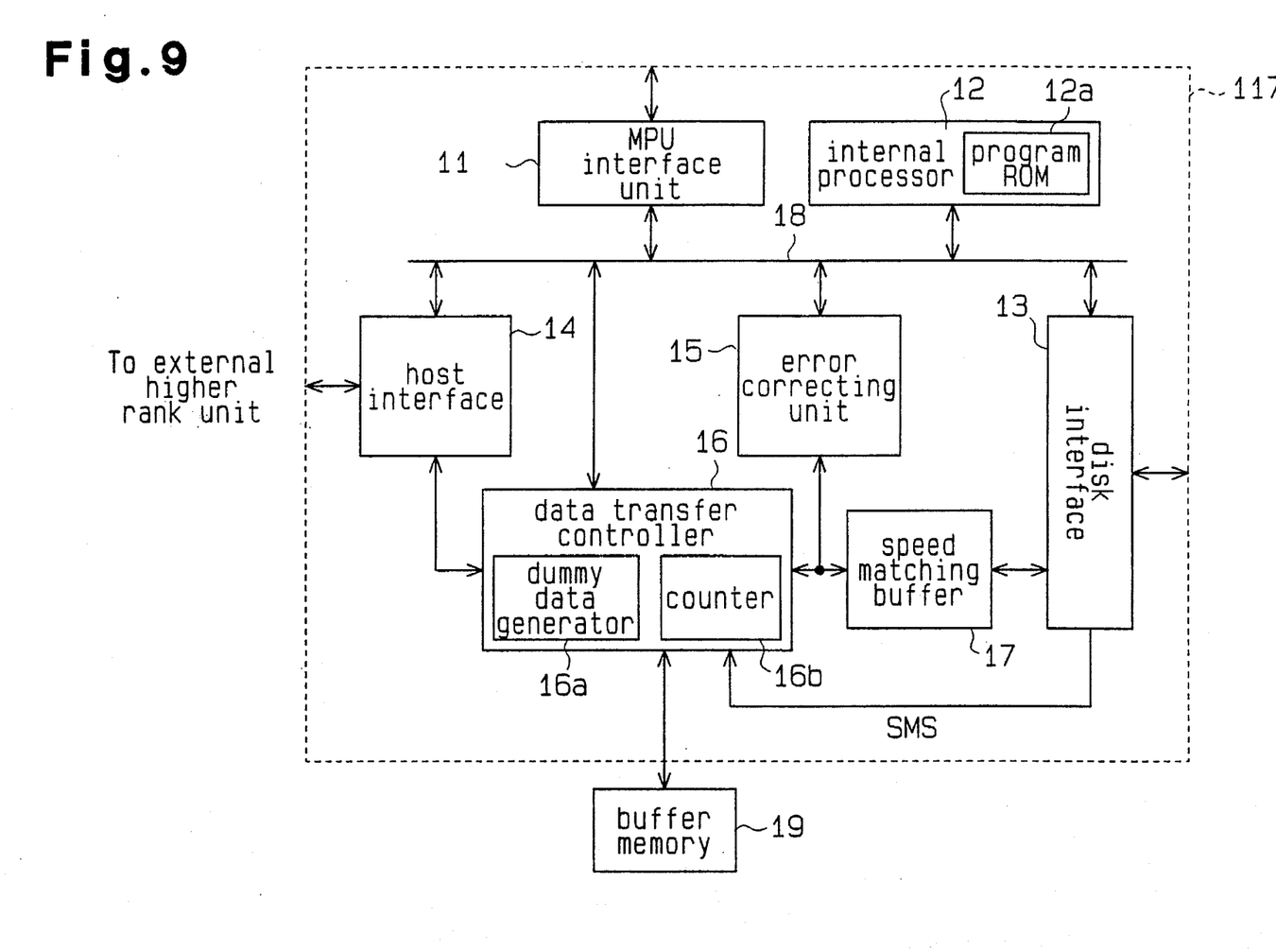
FIGS. 9 and 10 are block circuit diagrams for explaining modifications of the signal processing unit embodying this invention.

FIG. 9 shows a modification of the above-described embodiment. Although the error correcting unit 15 in the above embodiment receives data directly from the disk interface 13, a signal processing unit 117 may be modified so that the error correcting unit 15 receives data from the disk interface 13 via the speed matching buffer 17. The error correcting unit 15 can still perform the error correction operation.

Figure 10:
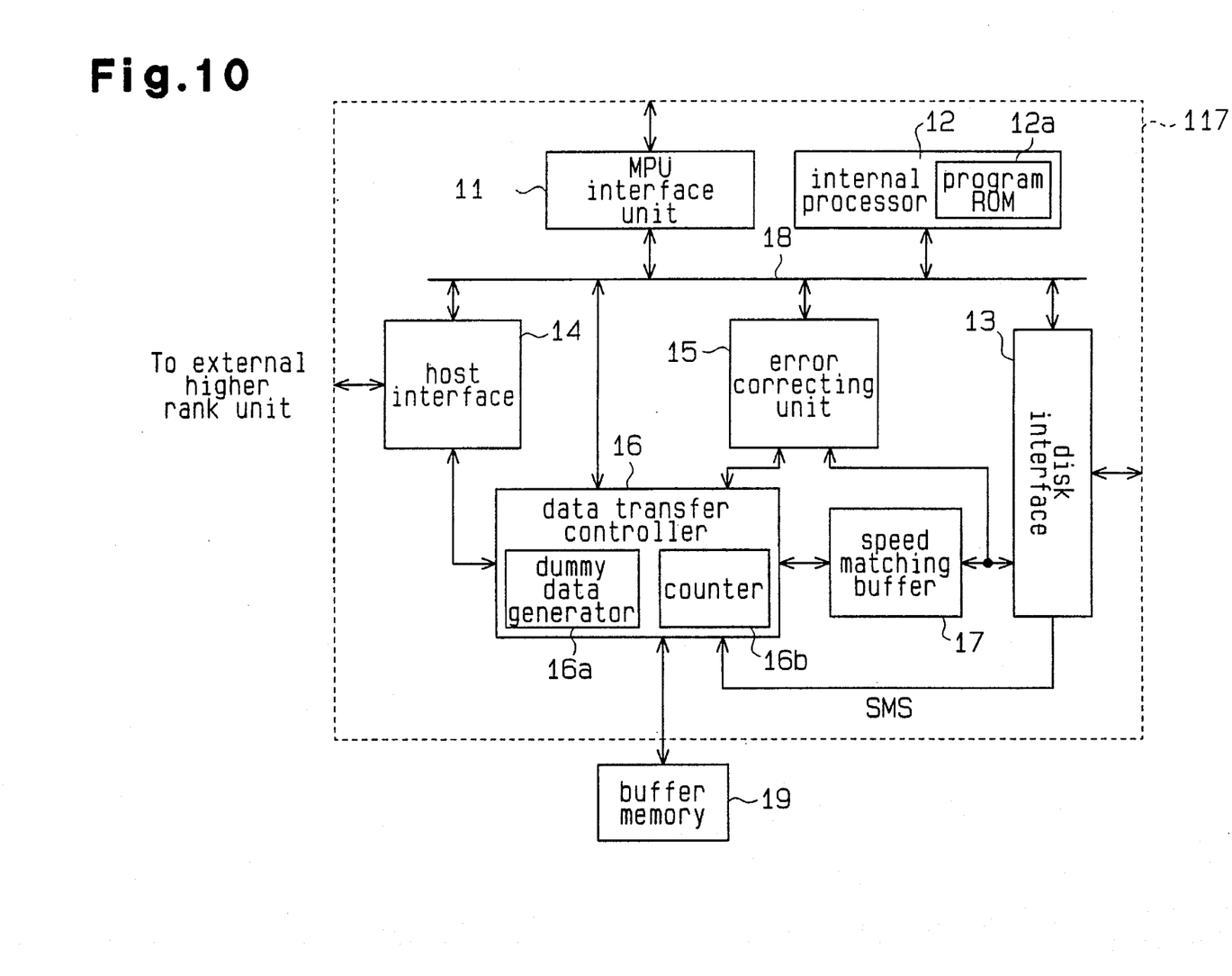

FIG. 10 shows another modification of the above-described embodiment. In previously described embodiments, the error correcting unit 15 executes an error correction operation without receiving any dummy data $D_D$. However, the embodiments may be modified such that dummy data $D_D$ is sent to the error correcting unit 15 from the data transfer controller 16 in synchronism with a clock signal. In this case, the dummy data $D_D$ may take other values than "0".

The invention may be applied to a read-only optical disk apparatus. Alternatively, the invention may also be applied to a disk apparatus which handles a magnetic disk as a recording medium.

The invention may also be modified in such a way that dummy data $D_D$ is generated and sent to the buffer memory 19 when the reading of a resync pattern instead of a sync pattern fails. Further, the invention may be adapted for a signal processing unit which generates dummy data $D_D$ when the reading of either a sync pattern or a resync pattern fails. The invention may also be adapted for a signal processing unit in which a down counter whose initial value is set to the number of pieces of dummy data is used as the counter 16b.

Furthermore, the invention may be adapted for a disk format other than the ISO standard format. In other words, this invention is applicable for any disk format as long as the applied method and apparatus perform a synchronized operation based on the sync patterns included in data read from a recording medium.

Therefore, the present examples and embodiments are to be considered as illustrative and not restrictive and the invention is not to be limited to the details given herein, but may be modified within the scope of the appended claims.

What is claimed is:

1. A method for correcting an error in read data from a disk as a recording medium, said method using a disk accessing apparatus including a drive head, a speed matching buffer and a buffer memory, and said method comprising the steps of:

receiving read data from a disk by the drive head;

detecting a sync pattern in the read data;

sequentially reading target data following the sync pattern to temporally store the target data to the speed matching buffer;

transferring the target data stored in the speed matching buffer to the buffer memory;

subjecting the target data stored in the buffer memory to an error correcting operation; and supplying the buffer memory with dummy data without passing through the speed matching buffer when the detection of the sync pattern is unsuccessful, wherein the dummy data corresponds to the target data following the sync pattern that fails to be detected.

2. The method according to claim 1, wherein said read data includes a plurality of sync patterns.

3. The method according to claim 2, wherein said plurality of sync patterns includes a plurality of resync patterns as well as at least one sync pattern.

4. The method according to claim 1, wherein said supplying of the dummy data comprises the steps of:

counting the number of times of outputting a byte of the dummy data to the buffer memory; and terminating the outputting of the bytes of the dummy data to the buffer memory when the count value reaches a predetermined value.

5. The method according to claim 1, wherein all the content of said dummy data are "0".

6. A signal processing unit for performing data error correction in read data from a disk as a recording medium by a drive head of a disk accessing apparatus, said signal processing unit comprising:

a disk interface for detecting a sync pattern in the read data and for sequentially reading and outputting target data following the detected sync pattern;

a speed matching buffer for temporally storing the target data supplied from said disk interface;

an error correcting unit, supplied with the target data from said disk interface, for performing error correction of the target data; and a data transfer controller for transferring the target data from said speed matching buffer to a buffer memory and for performing error correction of the target data stored in the buffer memory with reference to the result of the error correction by said error correcting unit, wherein said disk interface includes:

a sync pattern detector for outputting a sync detection signal when a sync pattern is detected, and a sync-miss detection signal when the detection of a sync pattern is unsuccessful; and a data acquisition circuit responsive to the sync detection signal for permitting the read data to be input, and for outputting the read data to said speed matching buffer, and wherein said data transfer controller includes a dummy data generator responsive to the sync-miss detection signal for generating dummy data corresponding to the target data following the sync pattern that fails to be detected, and for supplying said dummy to the buffer.

7. The signal processing unit according to claim 6, wherein the content of said dummy data are "0".

8. The signal processing unit according to claim 6, wherein said disk interface further includes:

a format counter for counting the number of pulses of a reference clock signal supplied thereto and for resetting the count value to a value that is synchronized with a position of the drive head with respect to the disk, wherein the operation of said sync pattern detector is based on the count value of said format counter; and a resync pattern detector for detecting a resync pattern in the read data by the drive head, based on the count value of said format counter, to output a resync detection signal indicative of the detection of resync pattern, wherein said data acquisition circuit is responsive to the resync detection signal as well as the sync detection signal for receiving the read data by the drive head, and reads and outputs necessary data from the read data in accordance with the count value of said format counter.

9. The signal processing unit according to claim 6, wherein said data transfer controller includes a counter for counting an amount of the dummy data output to the buffer memory, whereby the dummy data generator terminates the output of the dummy data when the count value reaches a predetermined value.

10. A disk accessing apparatus comprising a drive head for accessing a disk as a recording medium;

a rotation controller for controlling a first motor to cause the disk to rotate;

a radial movement controller for controlling a second motor to move the drive head with respect to the disk;

a drive head controller for controlling the drive head to reproduce data on the disk; and a system controller for generating control signals to be supplied to said rotation, radial movement and drive head controllers, wherein the disk accessing apparatus further comprises a signal processing unit coupled to said drive head and said system controller, for performing data error correction in read data from the disk, said signal processing unit comprising:

a disk interface for detecting a sync pattern in the read data and for sequentially reading and outputting target data following the detected sync pattern;

a speed matching buffer for temporally storing the target data supplied from said disk interface;

an error correcting unit, supplied with the target data from said disk interface, for performing error correction of the target data; and a data transfer controller for transferring the target data from said speed matching buffer to a buffer memory and for performing error correction of the target data stored in the buffer memory with reference to the result of the error correction by said error correcting unit, wherein said disk interface includes:

a sync pattern detector for outputting a sync detection signal when a sync pattern is detected, and a sync-miss detection signal when the detection of a sync pattern is unsuccessful; and a data acquisition circuit responsive to the sync detection signal for permitting the read data to be input, and for outputting the read data to said speed matching buffer, and wherein said data transfer controller includes a dummy data generator responsive to the sync-miss detection signal for generating dummy data corresponding to the target data following the sync pattern that fails to be detected, and for supplying said dummy data to the buffer memory.

11. A signal processing unit for performing data error correction in read data from a disk as a recording medium by a drive head of a disk accessing apparatus, said signal processing unit comprising:

a disk interface for detecting a sync pattern and a resync pattern in one sector of the read data and for sequentially reading and outputting target data following the detected sync pattern and the detected resync pattern;

a speed matching buffer for temporally storing the target data supplied from said disk interface;

an error correcting unit, supplied with the target data from said disk interface, for performing error correction of one sector of the target data; and a data transfer controller for transferring the target data from said speed matching buffer to a buffer memory and for performing error correction of the target data stored in the buffer memory with reference to the result of the error correction by said error correcting unit, wherein said disk interface includes:

a sync pattern detector for outputting a sync detection signal when a sync pattern is detected, and a sync-miss detection signal when the detection of a sync pattern is unsuccessful;

a resync pattern detector for outputting a resync detection signal when a resync pattern is detected; and a data acquisition circuit responsive to the sync and resync detection signals for permitting the read data to be input, and for outputting the read data to said speed matching buffer, and wherein said data transfer controller includes a dummy data generator responsive to the sync-miss detection signal for generating dummy data corresponding to the target data following the sync and resync patterns that fails to be detected, and for supplying said dummy data to the buffer memory.

12. An apparatus for reading data from a disk drive, said apparatus comprising:

a circuit for receiving read data from a disk of the disk drive;

a detector for detecting a reference pattern in the read data;

a data acquisition circuit for sequentially reading target data following the reference pattern on the disk;

a circuit for storing the target data read by said data acquisition circuit in a first storage buffer;

a data transfer controller for transferring the target data from the first storage buffer to a second storage buffer;

a circuit for directly supplying the second storage buffer with dummy data without first storing the dummy data in the first storage buffer when said detector fails to detect the reference pattern in the read data; and a error correction circuit for performing an error correction operation on the target data stored in the second storage buffer.

13. The apparatus according to claim 12, wherein the reference pattern is one of a sync pattern or a resync pattern.

14. The apparatus according to claim 12, wherein the dummy data is substituted for the target data that follows the reference pattern that fails to be detected by said detector.

15. The apparatus according to claim 12, wherein said data transfer controller comprises a dummy data generator for generating the dummy data.

* * * * *